INVENTOR.
JAMES R. WILLSON
BY
Caudn & Caudn
HIS ATTORNEYS

Nov. 19, 1968     J. R. WILLSON     3,411,710
CONTROL SYSTEM AND PARTS THEREFOR OR THE LIKE
Filed Sept. 17, 1965     5 Sheets-Sheet 3

INVENTOR.
JAMES R. WILLSON
BY
HIS ATTORNEYS

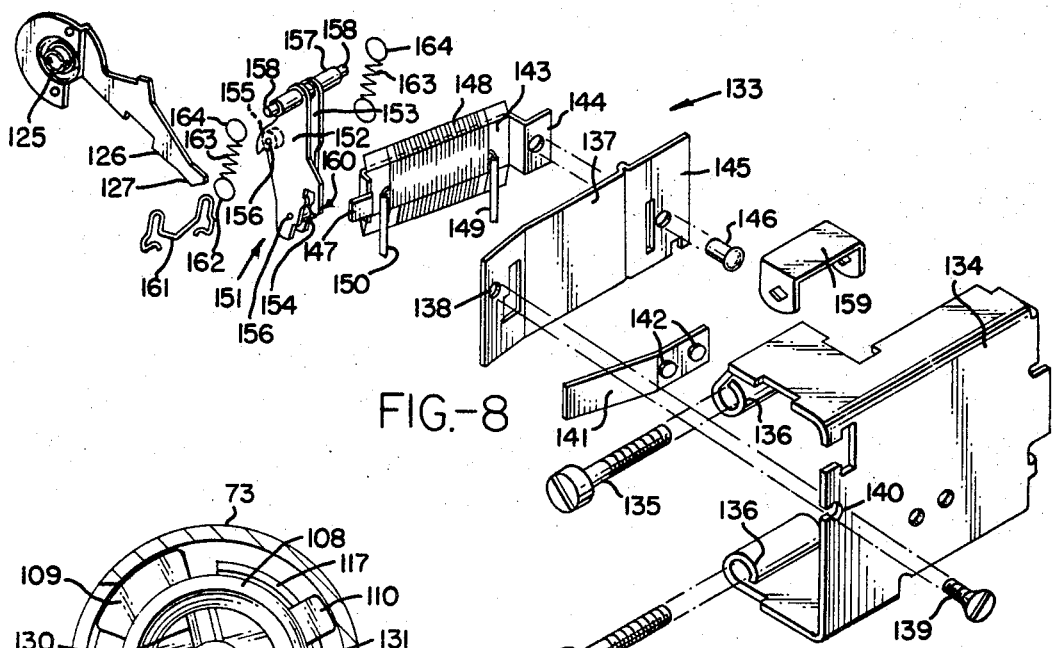
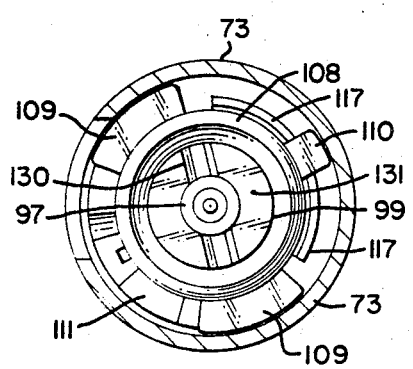
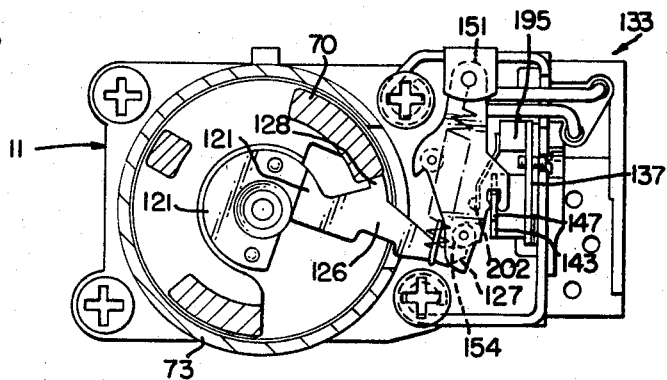
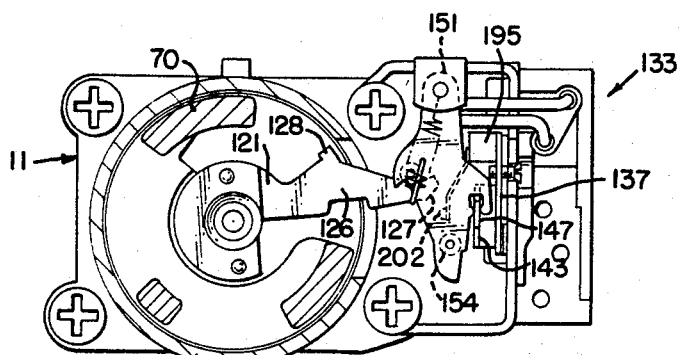

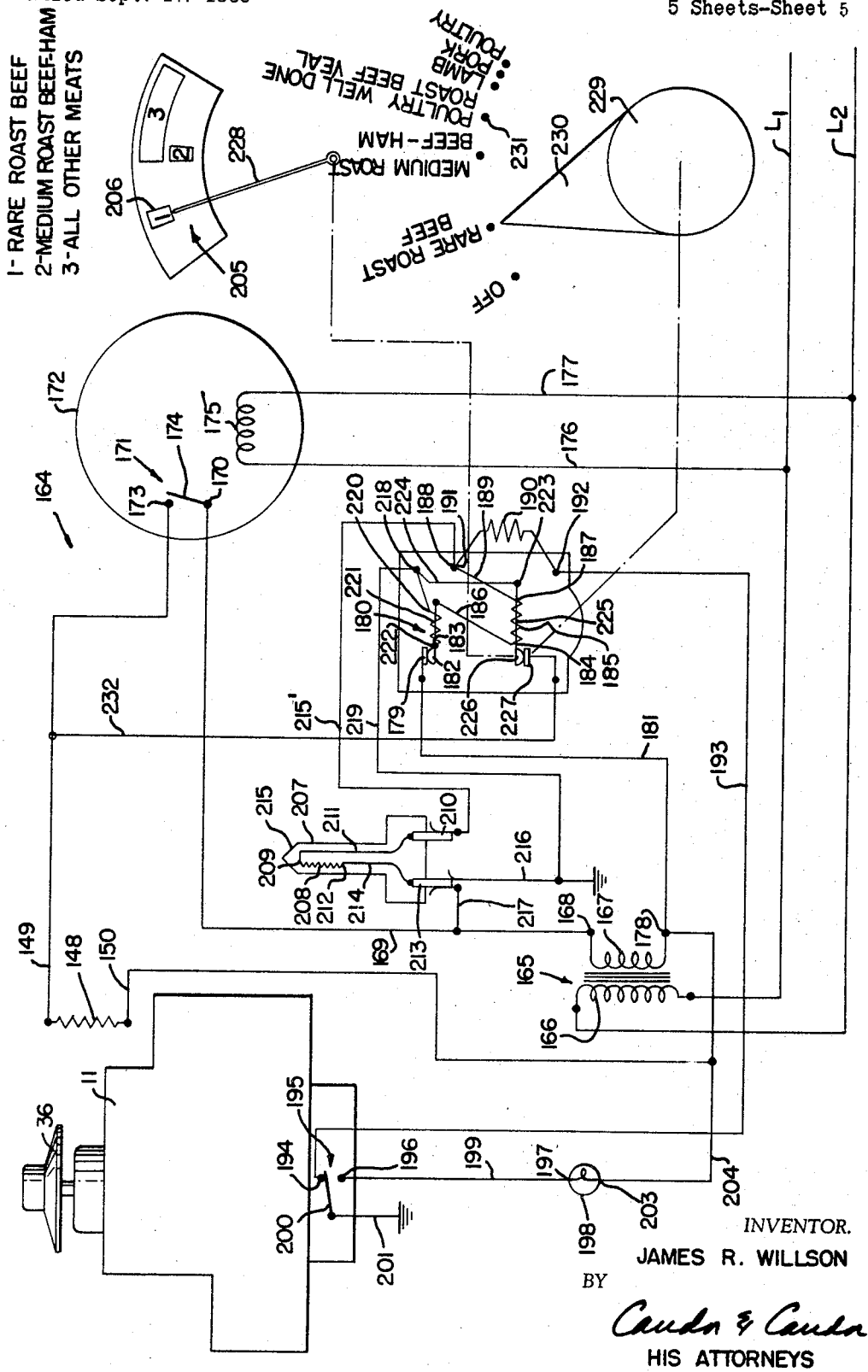

United States Patent Office 3,411,710
Patented Nov. 19, 1968

3,411,710
CONTROL SYSTEM AND PARTS THEREFOR OR THE LIKE
James R. Willson, Waynesboro, Tenn., assignor to Robertshaw Controls Company, Richmond, Va., a corporation of Delaware
Filed Sept. 17, 1965, Ser. No. 487,981
15 Claims. (Cl. 236—15)

ABSTRACT OF THE DISCLOSURE

This disclosure relates to a control system for an oven or the like wherein a meat probe is utilized to sense the internal temperature of meat being cooked in the oven and, after sensing a predetermined temperature of doneness of the meat, the meat probe will cause the heating means of the oven to be automatically reduced to a warmth retaining and non-cooking temperature, the meat probe controlling a temperature indicating means that will not be readily viewed by the housewife until the meat reaches a degree of doneness after the meat probe has automatically reduced the temperature of the oven.

---

This invention relates to an improved control system for controlling the operation of a heating means or the like as well as to improved parts for such a control system or the like.

One feature of this invention is to provide an improved control system for controlling the operation of the burner means of a domestic oven or the like in such a manner that a control device of the system can be set at a selected temperature to cook food in the oven at the selected temperature until the occurrence of an event, such as the lapse of a predetermined time or the operation of a meat probe, etc., at which time the control device will automatically reset itself to maintain the temperature of the oven at a lower non-cooking temperature whereby the cooked food therein will remain at a palatable condition without further cooking thereof for any desired period of time.

In this manner, the housewife or the like can set the control device of this invention to cook a roast or the like at a high cooking temperature for a period of time or under the influence of a meat probe, whereby after that period of time or after the meat probe has determined the desired doneness of the food, the temperature of the oven will be automatically reduced to a non-cooking but palatable maintaining temperature for a long period of time so that when the housewife returns, the food can then be served.

When the meat probe is utilized in the control system of this invention, a temperature effect indicating means of the system is only rendered viewable to the housewife or the like at the proper time by the meat probe so that no false reading of the indicating means can take place.

Accordingly, it is an object of this invention to provide an improved control system, having one or more of the novel features set forth above or hereinafter shown or described.

Another object of this invention is to provide an improved part for such a control system or the like.

Other objects, uses and advantages of this invention are apparent from a reading of this description which proceeds with reference to the accompanying drawings forming a part thereof and wherein:

FIGURE 5 is a cross-sectional view taken on line 5—5 of FIGURE 3.

FIGURE 6 is a view similar to FIGURE 5 and illustrates the control device in another operating position thereof.

FIGURE 7 is a fragmentary cross-sectional view taken on line 7—7 of FIGURE 2.

FIGURE 8 is an exploded perspective view of the heat motor arrangement of this invention.

FIGURE 9 is a schematic view illustrating the control system of this invention for operating the system illustrated in FIGURE 1.

Figure 1:
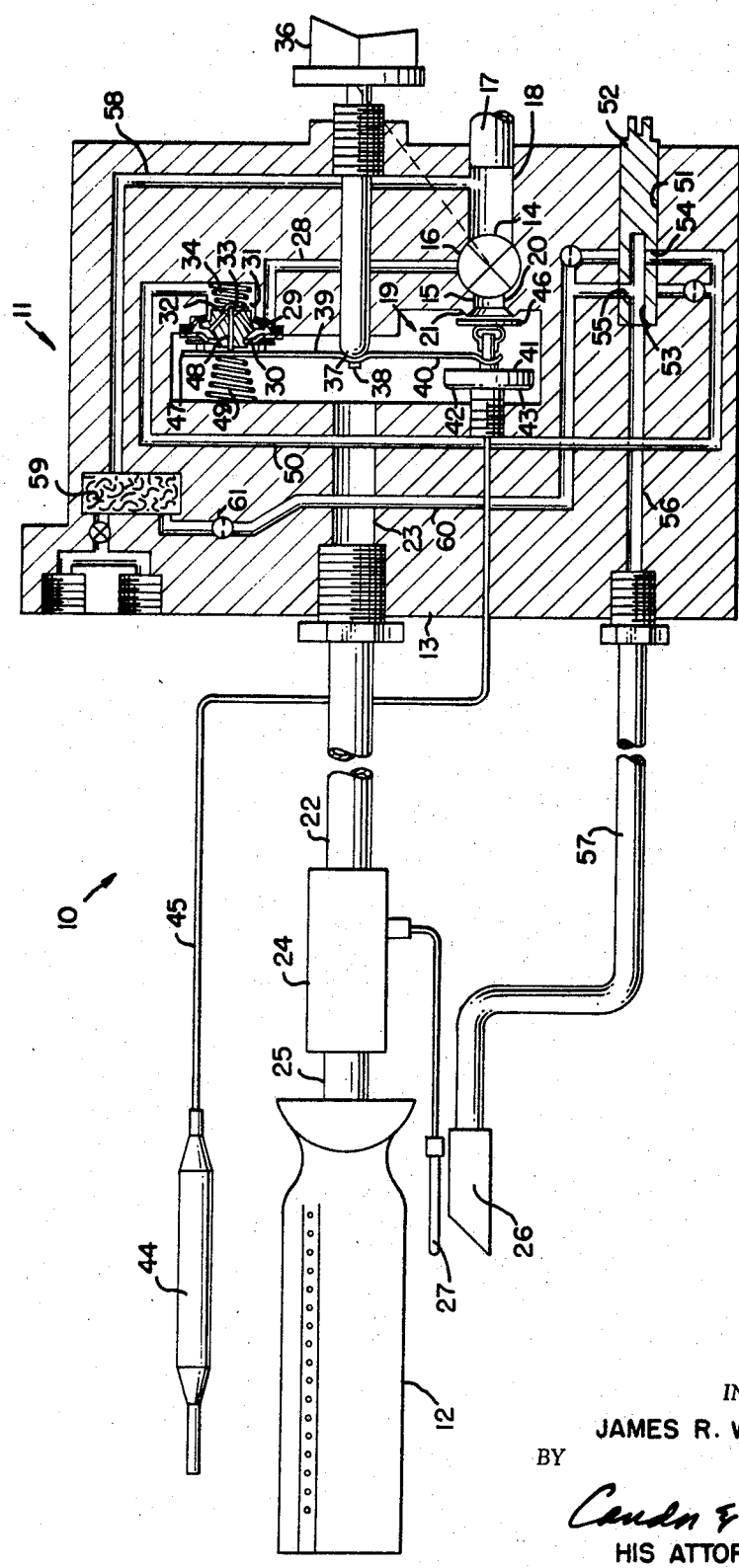
FIGURE 1 is a schematic view illustrating the improved system of this invention.

While the various features of this invention are hereinafter described and illustrated as being particularly adaptable to provide a control device for a fuel burning domestic oven or the like, it is to be understood that the various features of this invention can be utilized singly or in any combination thereof to provide a control device for other structure as desired.

Therefore, this invention is not to be limited to only the embodiment illustrated in the drawings because the drawings are merely utilized to illustrate one of the wide variety of uses of this invention.

Referring now to FIGURE 1, the improved control system of this invention generally indicated by the reference numeral 10 includes a control device 11 of this invention for controlling the operation of a main burner means 12 disposed in a domestic oven or the like, the control device 11 including a housing means 13.

The housing means 13 has an inlet 14 and an outlet 15 adapted to be interconnected together by a disc valve member 16 in a manner hereinafter described, the inlet 14 being adapted to be interconnected to a fuel supply conduit 17 by a passage means 18 and the outlet 15 being adapted to be interconnected to a chamber 19 by means of a passage means 20 terminating with a valve seat 21. The chamber 19 is adapted to be interconnected to a conduit 22 by means of a passage 23, the conduit 22 leading to a safety valve 24. The outlet side of the safety valve 24 is interconnected to the main burner 12 by a conduit 25.

A pilot burner 26 is disposed in the oven and is adapted to normally have a continuously burning small standby flame in a manner hereinafter described. However, when additional fuel is supplied to the pilot burner 26 in a manner hereinafter described, the same provides a relatively large heater flame which is sensed by a bulb 27 to open the safety valve 24 and interconnect the conduits 22 and 25 together whereby as long as a heater flame appears at the pilot burner 26, the chamber 19 of the control device 11 is interconnected to the main burner 12.

However, when the heater flame ceases to exist at the pilot burner 26, the safety valve 24 closes and prevents communication between the chamber 19 of the control device 11 and the main burner means 12 for a purpose hereinafter described.

When the disc valve 16 is moved to an "on" position thereof in a manner hereinafter described, the same not only interconnects the inlet 14 with the outlet 15 but also interconnects the inlet 14 with the passage means 28 leading to a chamber 29 defined by a valve seat member 30 carried by the housing 13. The chamber 29 is separated from a chamber 31 by a valve seat 32 on the valve seat member 30, the valve seat 32 being opened and closed by a valve member 33 urged to the closed position by a compression spring 34.

An axially movable fulcrum pin 35 is carried by the housing 13 in such a manner that the axial position of the fulcrum pin 35 relative to the housing 13 is controlled by a control knob 36 in a manner hereinafter described. The fulcrum pin 35 has a rounded end 37 provided with a cylindrical projection 38 passing through a suitable aperture in a lever 39 whereby the lever 39 is fulcrumed on the end 37 of the fulcrum pin 35.

One end 40 of the lever 39 bears against a movable wall 41 of an expansible and contractible element 42 having a wall 43 fixed to the housing 13, the interior of the expansible and contractible element 42 being interconnected to an oven temperature sensing bulb 44 by a conduit 45. The movable wall 41 of the expansible and contractible element 42 carries a valve member 46 for opening and closing the valve seat 21 in a manner hereinafter described.

The other end 47 of the lever 39 is adapted to engage a plunger 48 carried by the valve seat member 30 and engaging the valve member 33, the end 47 of the lever 39 being urged in a clockwise direction in FIGURE 1 by a compression spring 49. Thus, the opening and closing of the valve member 33 is controlled by the lever 39 in relation to the temperature sensed by the bulb 44 and the axial position of the fulcrum pin 35 in a manner hereinafter described.

The chamber 31 of the housing 13 is interconnected to a passage means 50 leading to a bore 51 in the housing 13, an adjusting key 52 being rotatably disposed in the bore 51 and having a longitudinal bore 53 interconnected to the exterior of the key 52 by transverse bores 54 and 55. The longitudinal bore 53 of the adjusting key 52 is disposed in communication with a passage 56 leading to a conduit 57 interconnected to the pilot burner 26.

Another passage 58 is formed in the housing 13 and is interconnected with the passage 18 at a point upstream from the disc valve 16 as well as to a filter chamber 59. The filter chamber 59 is interconnected to a passage 60 leading to the bore 51 in the manner illustrated in FIGURE 1, the passage 60 having an orifice 61 therein.

Thus, it can be seen that when the adjusting key 52 is disposed in the "on" position, as illustrated in FIGURE 1, fuel from the supply conduit 17 is adapted to pass through the passages 58 and 60 to the passage 55 of the adjusting key 52, and thus, to the pilot burner 26 to provide the previously mentioned small standby flame, which does not affect the safety valve 24.

However, when the disc valve 16 is moved to an opened position and the valve member 33 is moved to an opened position in a manner hereinafter described, the additional fuel being supplied through the passage 50 to the passage 54 of the adjusting key 52 causes the pilot burner 26 to provide a large heater flame which is sensed by the bulb 27 and causes the safety valve 24 to open and interconnect the conduits 22 and 25 together so that fuel can issue from the main burner 12 and be ignited by the pilot burner 26. However, when the valve member 33 closes, the additional supply of fuel to the pilot burner 26 is terminated whereby the large heater flame ceases to exist, even though the small standby flame continues, whereby the safety valve 24 will close and prevent fuel from issuing from the main burner 12.

Thus, as the valve member 33 cycles between its open and closed positions in a manner hereinafter described, the main burner 12 is cycled on and off to maintain the temperature of the oven at a temperature selected by the control knob 36 in a manner hereinafter described.

Figure 2:
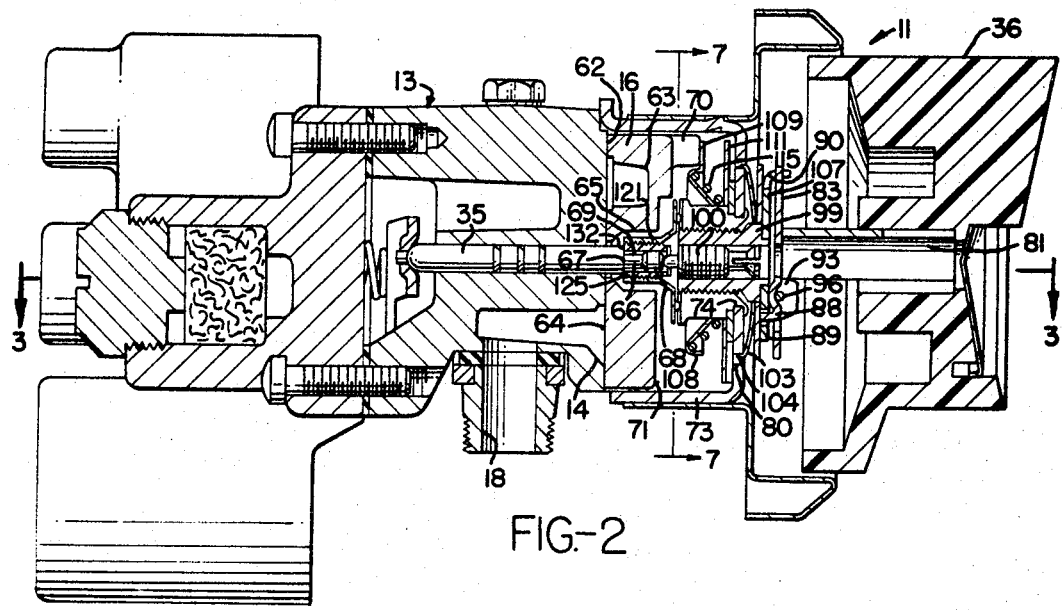
FIGURE 2 is a cross-sectional view of the control device of FIGURE 1.
Figure 3:
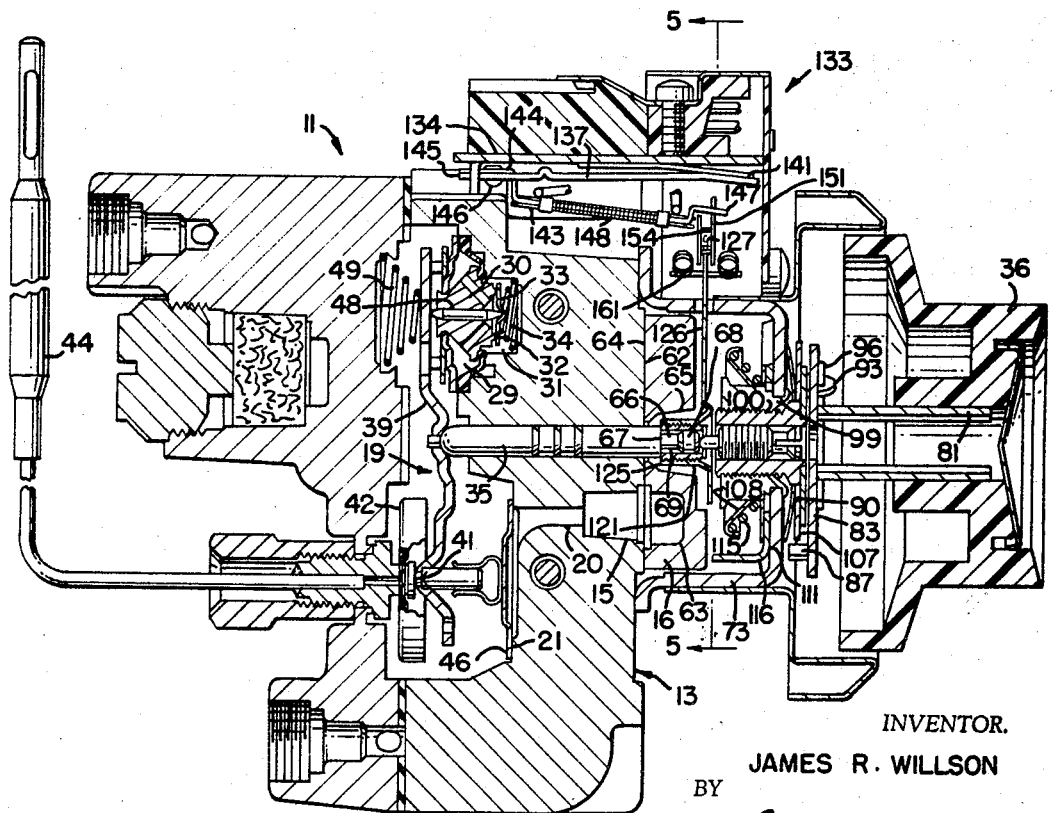
FIGURE 3 is a cross-sectional view taken on line 3—3 of FIGURE 2.

As illustrated in FIGURES 2 and 3, the housing means 13 defines a flat surface 62, interrupted by the spaced inlet 14 and outlet 15 adapted to be interconnected together by a groove 63 in the disc valve 16.

In particular, the groove 63 in the disc valve 16 interrupts a valve surface 64 thereof with the valve surface 64 being disposed in sealing and sliding contact with the valve seat surface 62 of the housing 13, the disc valve 16 having an opening 65 passing therethrough and loosely receiving the end 66 of the fulcrum pin 35. The end 66 of the fulcrum pin 35 defines an annular shoulder 67 spaced from a cylindrical portion 68 by a reduced cylindrical portion 69 for a purpose hereinafter described.

Figure 4:
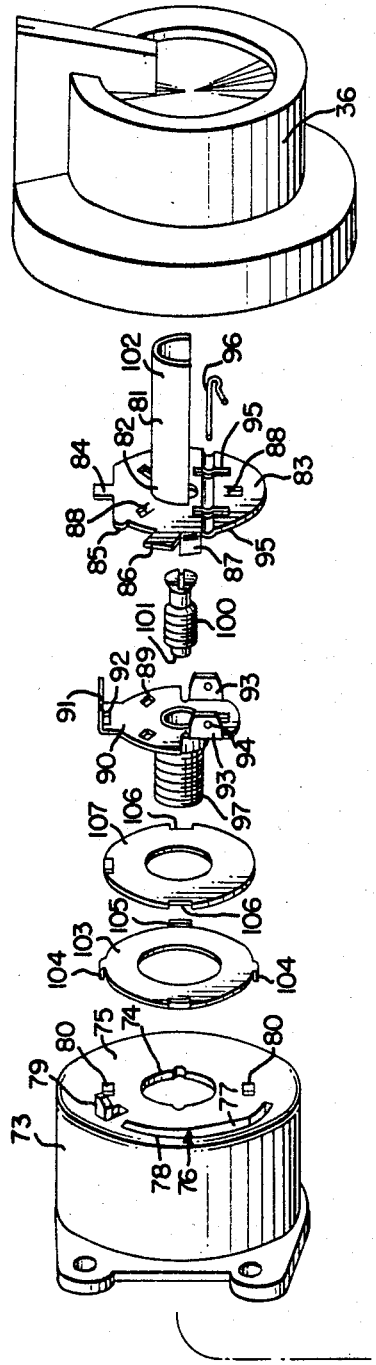
FIGURE 4 is an exploded perspective view of various parts of the control device of this invention.
Figure 4:
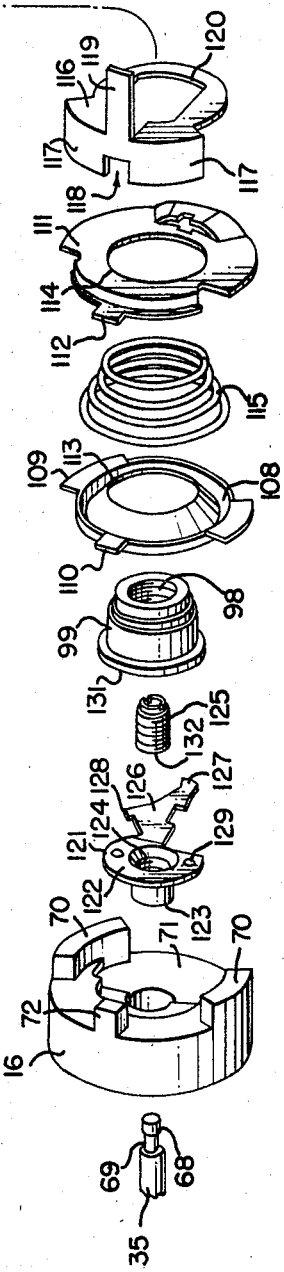

As illustrated in FIGURES 2 and 4, the disc valve 16 has a pair of spaced arcuate embossments 70 formed on the side 71 thereof and a smaller substantially rectangular embossment 72 intermediate the embossments 70 for a purpose hereinafter described.

A cup-shaped member 73 forms part of the housing means 13 and is telescopically disposed over the disc valve 16, the member 73 having an aperture 74 passing therethrough in the closed end 75 thereof. The closed end 75 has a cam slot 76 formed therein and defining opposed camming edges 77 and 78 best illustrated in FIGURE 4. In addition, a stop tang 79 projects from the wall 75 and a pair of apertures 80 pass through the wall 75.

A C-shaped shaft 81 has one end 82 thereof interconnected to a plate member 83 having three outwardly projecting tangs, 84, 85 and 86 and a rearwardly extending tang 87 to cooperate with the stop tang 79 in a manner hereinafter set forth. In addition, rearwardly directed tangs 88 are formed in the plate member 83 and are adapted to register with apertures 89 formed on another plate member 90.

The plate member 90 has a bent over tang 91 provided with a slot 92 and a pair of ears 93 having apertures 94 passing therethrough. The members 83 and 90 are adapted to be assembled together with the tang 84 of the member 83 received in the slot 92 of the member 90 and with the ears 93 of the member 90 passing through slots 95 of the plate member 83 and pinned thereto by a pin means 96 passing through the apertures 94. In this manner, rotation of the shaft 81 causes like rotation of the plate member 90.

The plate member 90 carries a tubular extension 97 both internally and externally threaded, the tubular extension 97 adapted to be threadedly received in a threaded bore 98 of a member 99 fixed in the aperture 74 of the housing part 73.

An adjusting screw 100 is threaded in the tubular part 97 of the plate 90 and has an end 101 adapted to abut the end 66 of the fulcrum pin 35.

Thus, rotation of the control knob 36 fastened on the other end 102 of the C-shaped shaft 91 causes the member 97 to be threaded into or out of the fixed threaded member 99 to adjust the axial position of the fulcrum pin 35.

A bowed spring-like washer 103 is provided and has tangs 104 adapted to register in the apertures 80 of the housing part 73, the spring means 103 having reversely directed tangs 105 adapted to be received in notches 106 in a washer-like member 107, the spring member 106 and washer-like member 107 being disposed between the closed wall 75 of the housing part 73 and the plate member 90 to place an outward force on the plate-like member 90, and, thus, provide "feel" in adjusting the rotational position of the knob 36 relative to the housing 13.

A spring retainer 108 is provided and has outwardly directed tangs 109 adapted to rest on the embossments 70 of the disc valve 16 and another tang 110. Another spring retainer 111 is provided and has an outwardly directed tang 112 similar to tang 110 of the spring retainer 108, retainers 108 and 111 respectively having openings 113 and 114 passing therethrough so that the same can be telescoped on the fixed threaded member 99. A compression spring 115 is adapted to be disposed between the spring retainers 108 and 111 to compact a clutch member 116 against the inside surface of the wall 75 of the housing part 73.

The clutch part 116 has a pair of depending flanges 117 defining a notch 118 therebetween adapted to not only receive the tangs 112 and 110 of the spring retainers 111 and 108, but to also receive the rectangular embossment 72 of the disc valve 16. In addition, the clutch member 116 has an outwardly directed tang 119 adapted to pass through the cam slot 76 of the housing part 73, the clutch part or drive member 116 having an aperture 120 passing therethrough to loosely receive the fixed member 99.

The operation of the control device 11 as utilized in the system 10 of this invention, with the parts heretofore described, will now be described.

Assuming that the control knob 36 is disposed in its "off" position as illustrated in FIGURE 1, the groove 63 of the disc valve 16 is in such a position that the same does not interconnect the inlet 14 with the outlet 15 nor the inlet 14 with the passage means 28 whereby no fuel issued from the main burner means 12 and only a small standby flame exists at the pilot burner 26 as the adjusting key 52 is normally disposed in the "on" position as illustrated in FIGURE 1.

When the operator desires to turn on the oven to a set temperature thereof, the operator grasps the knob 36 and rotates the same in a counterclockwise direction as illustrated in FIGURE 5 whereby rotation of the knob 36 causes like rotation of the plate 83 whereby the tang 85 of plate 83 bears against the tang 119 of the drive member 116 to cause like rotation therewith. As the drive member 116 is being rotated, the same, through the notch 118 thereof, rotates the spring retainers 111 and 108 as well as the disc valve 16 to bring the groove 63 of the disc valve 16 in such a position that the same fully interconnects the inlet 14 with the outlet 15, as well as to the passage means 28.

However, when the disc valve 16 is rotated to its fully "on" position, it can be seen that the edge 77 of the cam slot 76 slides the drive member 116 radially outwardly whereby the tang 85 of the plate member 83 is no longer in engagement with the tang 119 of the drive member 116 so that the control knob 36, when further rotated in a counterclockwise direction, does not further rotate the disc valve 16 from its fully "on" position as illustrated in FIGURE 6. Thus, the sliding movement of the drive member 116 declutches the disc valve 16 from the control knob or manipulator means 36.

During the rotational movement of the control knob 36 from its position to a set temperature position thereof, the threaded member 97 of the plate 90 is backed out of the fixed threaded member 99 in such a manner that the fulcrum pin 35 is adjusted to a new position thereof to the right in FIGURES 2 and 3 as selected by the temperature setting of the control knob 36.

This axial movement of the pin 35 from its "off" position to its selected temperature position permits the compression spring 49 to pivot the lever 39 on the fulcrum pin 35 in such a manner that the pin 48 carried by the valve seat member 30 is moved to the right in FIGURE 3 to open the valve member 33 away from the valve seat 32 so that fuel in the passage 28 is now adapted to pass into the chamber 31 and, thus, to the pilot burner 26 to create the large heater flame at the pilot burner 26. When the large heater flame exists at the pilot burner 26, the temperature sensing bulb 27 senses the presence of the same and opens the safety valve 24 whereby fuel in the chamber 19 is adapted to flow to the main burner 12 and be ignited by the pilot burner 26.

Thus, as long as the temperature of the oven remains below the selected temperature, the main burner means 12 is operating.

However, when the temperature of the oven reaches the selected temperature, as sensed by the sensing bulb 44, the movable wall 41 of the expansible and contractible element 42 has moved to the right in FIGURE 3 to such an extent that the same pivots the lever 39 on the fulcrum pin 35 to a position which permits the valve member 33 to close against the valve seat 32 and terminate the additional flow of fuel to the pilot burner 26. Thus, the large heater flame at the pilot burner 26 ceases to exist whereby the safety valve 24 closes to terminate the flow of fuel to the main burner means 12.

Should the temperature of the oven again fall below the selected temperature, the movable wall 41 of the element 42 has moved to the left in FIGURE 3 a distance sufficient to cause the lever 39 to again open the valve member 33 so that the heater flame can again exist at the pilot burner 26. With the heater flame at the pilot burner 26, the safety valve 24 again opens so that fuel can again issue from the main burner means 12 and be ignited by the pilot burner 26.

Thus, it can be seen that the control device 11 in this invention permits the control knob 36 to be turned from an "off" position thereof to not only rotate the disc valve 16 to an "on" position thereof but to also adjust the axial position of the fulcrum pin 35 so that the control device 11 will maintain the oven at the selected temperature, the control device 11 of this invention being so constructed and arranged that the drive member 116 declutches the disc valve 16 from the control knob 36 during the rotational movement of the control knob 36 after the disc valve 16 has been disposed in its fully "on" position.

Should a malfunction occur in the control device 11 of this invention, so that the valve member 33 will not close whereby the burner means 12 remains on in a runaway condition, the increased temperature in the oven will cause the movable wall 41 of the power element 42 to further move to the right in FIGURE 3 to bring the valve member 46 closer to the valve seat 21 to throttle the flow of fuel to the burner means 12 in such a manner that the burner means 12 can not produce a temperature in the oven above a predetermined safe temperature.

When it is desired to turn off the system 10 of this invention, the operator rotates the control knob 36 back to the "off" position illustrated in FIGURE 5. As the plate 83 is being rotated to its "off" position, the tang 86 thereof engages the tang 119 of the drive member 116 and rotates the drive member 116 therewith whereby the disc valve 16 is rotated back to its "off" position, the drive member 116 sliding radially inwardly relative to the disc valve 16 by means of the edge 78 of the cam slot 76 in the housing part 73. As the control knob 36 is rotated back to its "off" position, the tang 119 on the drive member 116 engages the end of the slot 76 when the control knob is disposed in its "off" position whereby the cam slot 76 determines the "off" position of the control knob 36.

However, when the control knob 36 is moved in an "on" direction, the fully "on" position of the control knob 36 is limited by the tang 87 of the plate 83 engaging the stop tang 79 on the housing part 73.

As previously set forth, the control device 11 of this invention is adapted to automatically reduce the temperature setting of the control device 11 after the occurrence of an event even though the control device has been set at a high cooking temperature in the manner previously set forth.

In particular, it can readily be seen in FIGURES 3–5 that an actuator 121 is provided and comprises a plate-like member 122 having a tubular extension 123 which is internally threaded at 124 to threadedly receive a hollow tubular member 125 which is externally threaded into the tubular extension 123 of the actuator 121. The actuator 121 has an integral outwardly extending arm 126 provided with a free end 127 and an outwardly extending tang 128 for a purpose hereinafter described.

The assembled members 121 and 125 are adapted to telescopically receive the end 66 of the fulcrum pin 35 in the manner illustrated in FIGURES 2 and 3 with the plate portion 122 of the actuator 121 having outwardly extending embossments 129 normally received in recesses 130 formed in the end surface 131 of the fixed member 99 as illustrated in FIGURE 7.

In this manner, the fulcrum pin 35 is adapted to be axially adjusted relative to the actuator 121 by having the end 66 thereof movable in the bore of the threaded member 125. However, the end 132 of the threaded member 125 carried by the actuator 121 is adapted to engage the shoulder 67 of the fulcrum pin 35 for a purpose hereinafter set forth.

A heat motor 133 is provided and a casing member 134 thereof adapted to be fastened to the housing means 13 by threaded fastening members 135 passing through hollow cylindrical members 136 of the casing 134 in the manner illustrated in FIGURE 8.

A plate-like member 137 is provided and has a threaded aperture 138 adapted to receive a threaded member 139 passing through an aperture means 140 of the casing 134 to attach the plate 137 thereto. A spring member 141 is fastened to the inside of the casing 134 by rivet means 142 so as to be disposed between the plate 137 and the casing 134 whereby the position of the plate 137 relative to the casing 134 can be adjusted by adjusting the threaded relation of the threaded member 139 relative to the plate 137.

A bimetal member 143 is provided and has one end 144 fastened to the end 145 of the plate member 137 by rivet means 146 whereby the other end 147 of the bimetal member 143 is free to move relative to the plate 137. A heating coil 148 is disposed around the bimetal member 143 and has a pair of leads 149 and 150 to be attached to any suitable structure.

For example, the leads 149 and 150 can be placed across a power source by having a switch means closed by means of a timer clock or a meat probe in a manner hereinafter described.

A latch member 151 is provided and comprises a pair of plates 152 and 153 held in spaced relation by a pair of interposed rollers 154 and 155 mounted on pin means 156 passing through the plate members 152 and 153 to hold the same together. The plate members 152 and 153 are pivotally mounted on a pivot pin means 157 having the opposed ends 158 thereof mounted in a bracket 159 carried by the casing means 134.

The plate member 152 of the latch member 151 has a notch 160 which receives the free end 147 of the bimetal member 143.

A clip member 161 is hooked around the free end 127 of the arm 126 of the actuator 121 and is interconnected to the ends 162 of a pair of tension springs 163 respectively having the other ends 164 thereof carried by the pivot pin means 157.

With the parts assembled in the manner illustrated in FIGURE 8 and with the control device 11 disposed in the "off" position, it can be seen that the tension springs 163 tend to rotate the actuator 121 in a counterclockwise direction. However, the latch member 151 is so disposed relative to the actuator 121 that the end 127 of the arm 126 thereof bears against the roller 154 so that the actuator 121 cannot be rotated.

In addition, the disc valve 16 is disposed in such a position that one of the embossments 70 thereof is disposed against the tang 128 of the arm 126 of the actuator 121 should the heat motor 133 be accidentally actuated when the control device 11 is in its "off" position.

The operation of the control device 11 when utilizing the heat motor means 133 of this invention will now be described.

As previously set forth, the operator turns the control knob 36 from its "off" position to any "on" position thereof whereby the disc valve 16 is moved from the position illustrated in FIGURE 5 to the position illustrated in FIGURE 6 until the clutch member 116 slides radially outwardly by means of the cam slot 76 to declutch the control knob 36 from the disc valve 16 so that the disc valve 16 remains in its full "on" position. However, further rotation of the control knob 36 in "on" direction to the selected temperature permits the fulcrum pin 35 to be axially moved to the right in FIGURES 2 and 3 until the same is set in the desired temperature setting position thereof in the manner previously described whereby the control device 11 will maintain the temperature at the selected cooking temperature.

Thus, the oven is maintained at the selected cooking temperature by means of the lever 39 and thermostat 42 in the manner previously described.

However, when it is desired to have the temperature of the oven reduced to a lower temperature setting thereof, such as a non-cooking but warmth-retaining temperature, some means energizes the coil 148 of the bimetal member 143. For example, switch means can be closed in a manner hereinafter described to place the coil 148 across a power source either by a timer clock or a meat probe.

In any event, when the coil 148 is energized, the same heats the bimetal member 143 to cause the end 147 thereof to move toward the plate 137 whereby the latch member 151 is moved from the position illustrated in FIGURE 5 to the position illustrated in FIGURE 6 so that the end 127 of the arm 126 of the actuator 121 can be moved in a counterclockwise direction by the tension spring 163 until the end 127 of the arm 126 of the actuator 121 abuts against the roller 155 of the latch member 151 in the manner illustrated in FIGURE 6.

This counterclockwise rotation of the actuator 121 causes the embossments 129 thereof to ride out of the recesses 130 on the end surface 131 of the fixed member 99 so as to cam the actuator 121 to the left in FIGURES 2 and 3 whereby the end 132 of the threaded member 125 carried by the actuator 121 pushes against the shoulder 67 of the fulcrum pin 35 and moves the same to the left to reset the axial position of the fulcrum pin 35 at a lower temperature setting thereof.

Thus, with the fulcrum pin 35 now set in a low temperature setting thereof by means of the actuator 121, the control device 11 now maintains the oven at the reduced temperature as previously determined by the threaded position of the threaded member 125 relative to the tubular extension 123 of the actuator 121.

Thus, it can be seen that initially the oven of this invention can be set at a high cooking temperature by the control knob 36 and, thereafter, the heat motor 133 can be energized in a manner hereinafter described to automatically reduce the temperature setting of the control device 11 of this invention to maintain the oven at a lower temperature until the control knob 36 is again manually turned to "off" position thereof.

For example, the housewife or the like can place food in the oven of the system 10 of this invention and turn the control knob 36 to a high cooking temperature so that the food will be cooked at the high temperature for a selected period of time. The housewife can also set a timer clock so that after the lapse of a predetermined time, the timer clock will energize the coil 148 of the heat motor 133. In this manner, the housewife can leave the oven unattended and the control device 11, after a predetermined lapse of time as set by the timer motor, will automatically reduce the temperature setting of the oven by means of the actuator 121 in the manner previously described so that the food therein can remain at a low temperature without further cooking thereof until the housewife eventually returns and turns off the control device 11 whereby the food is maintained at a palatable temperature for serving thereof.

Thus, it can be seen that the heat motor 133 of this invention need only be momentarily energized in a manner sufficiently to heat up the bimetal member 133 so that the end 137 thereof will move toward the plate 137 to move the latch member 151 in a manner to unlatch the actuator 121 so that the same can move from the position illustrated in FIGURE 5 to the position illustrated in FIGURE 6.

When it is desired to turn off the control device 11 of this invention after the same has been reset by the actuator 121 in the manner previously described, the operator rotates the control knob 36 from its "on" position back to its "off" position whereby the tang 86 of the plate member 83 eventually comes into engagement with the tang 119 of the clutch member 116 to move the same back to its "off" position whereby the disc valve 16 is rotated toward its "off" position.

As the disc valve 16 is rotated from the position illustrated in FIGURE 6 back to its "off" position illustrated in FIGURE 5 the embossment 70 of the disc valve 16 engages the tang 128 of the actuator 121 and drives the same in a clockwise direction as illustrated in FIGURE 5 whereby the end 127 of the arm 126 of the actuator 121 can cam past the roller 154 of the latch member 151 to be again latched by the latch member 151 in the manner illustrated in FIGURE 5 because the bimetal member 143 now is adapted to have the end 147 moved away from the plate 137 to maintain the latch member 151 in the position illustrated in FIGURE 5.

Thus, it can be seen that the control device 11 of this invention has a means for automatically adjusting the temperature setting thereof and holding the control device 11 in the adjusted temperature setting position thereof after the occurrence of an event that actuates the actuator 121 which can be subsequently relatched in its non-actuating position when the control device 11 is returned to its "off" position.

The control system for automatically resetting the control device 11 from its selected high cooking temperature to the relatively low, non-cooking and warmth retaining temperature setting thereof is generally indicated by the reference numeral 164 in FIGURE 9 and will now be described.

A transformer 165 is provided and has a primary coil 166 provided with opposed ends respectively interconnected to power leads $L^1$ and $L^2$. The secondary coil 167 of the transformer 165 has one end 168 interconnected to a lead 169 leading to a contact 170 of an electrical switch 171 opened and closed by a conventional timer clock 172 in a manner well known in the art.

In particular, the electrical switch 171 includes another contact 173 and a switch blade 174, the switch blade 174 normally being disposed in a position to prevent electrical connection between the contacts 170 and 173. However, when the timer clock 172 is set in a conventional manner to close the switch 171 after the lapse of a predetermined time, the timer clock 172 will close the switch blade 174 against the contact 173 to interconnect the contacts 170 and 173 together. The contact 173 of the switch 171 is interconnected to the lead 149 of the heating coil 148 of the previously described heat motor 133.

The timer motor 172 is operated by a coil 175 having its opposed ends respectively interconnected to the power leads $L^1$ and $L^2$ by leads 176 and 177.

The other end 178 of the secondary coil 167 of the transformer 165 is interconnected to a fixed contact 179 of a voltage regulator 180 by a lead 181. A movable contact 182 of the conventional voltage regulator 180 is interconnected by a bimetallic and conductive switch blade 183 to one end 184 of a heating coil 185 by a lead 186. The other end 187 of the heating coil 185 is interconnected to a terminal 188 by a lead 189.

An anticipator resistor 190 has one end interconnected to the terminal 188 and the other end 192 interconnected to a lead 193 leading to a fixed contact 194 of a switch means 195 carried by the control device 11.

The switch means 195 includes another fixed contact 196 interconnected to one side 197 of a light source 198 by a lead 199. The switch 195 includes a movable switch blade 200 movable between the contacts 194 and 196 and being interconnected to the ground by a lead 201.

As illustrated in FIGURES 5 and 6 the electrical switch 195 carried by the control device 11 has an actuator arm 202 disposed in the path of movement of the end 127 of the arm 126 of the actuator 121.

Thus, the switch blade 200 is normally disposed in the position illustrated in FIGURE 9 during use of the control device 11 to maintain the temperature in the oven at a high cooking temperature. However, when the heat motor 133 is energized in a manner hereinafter described to move the latching member 152 from the position illustrated in FIGURE 5 to the position illustrated in FIGURE 6, the counterclockwise movement of the end 127 of the arm 126 of the actuator 121 from the position illustrated in FIGURE 5 to the position illustrated in FIGURE 6 actuates the actuator 202 of the switch 195 to move the switch blade 200 out of electrical contact with the contact 194 and into contact with the contact 196 whereby the end 192 of the anticipator resistor 190 is disconnected from the ground. The switch blade 200 remains in electrical contact with the contact 196 until the end 127 of the arm 126 of the actuator 121 is moved clockwise back from the position illustrated in FIGURE 6 to the position illustrated in FIGURE 5 and again actuates the actuator 202 of the switch means 195 to return the switch blade 200 back to the normal position illustrated in FIGURE 9.

The other side 203 of the light source 198 is interconnected to the end 178 of the secondary winding 167 of the transformer 165 by a lead 204.

The light source 198 is so disposed on the apparatus utilizing the system 164 of this invention that when the light source 198 is energized in a manner hereinafter described, the same renders viewable an indicator scale 205 on the control panel of the oven or the like which is not readily viewable when the light source 198 is in its deenergized condition.

The indicator dial 205 is provided with indicating media 206 suitably coded in the manner illustrated in FIGURE 9 to indicate to the housewife or the like the doneness of the food in the oven when a meat probe 207 is utilized in a manner hereinafter described.

The meat probe 207 carries a resistor 208 having one end 209 interconnected to a plug in terminal 210 by a lead 211. The other side 212 of the meat probe resistor 208 is interconnected to another plug in terminal 213 by a lead 214.

The resistor 208 of the meat probe 207 is carried by an insertable part 215 of the meat probe 207 so that the resistor 208 will sense the internal temperature of the food receiving the meat probe 207. The resistor 208 of the meat probe 207 is so constructed that the electrical resistance thereof decreases as the temperature thereof rises for a purpose hereinafter described.

When the meat probe 207 is plugged in to the apparatus utilizing the system 164, the terminal plug 210 of the meat probe 207 is electrically interconnected to a lead 215' leading to the previously described terminal 188. The plugged in meat probe 207 has its terminal plug 213 electrically interconnected to a lead 216 leading to the ground as well as to a branch lead 217 leading to the previously described lead 169.

The lead 216 is interconnected to a terminal 218 by a lead 219. The terminal 218 is interconnected to one side 220 of a heating coil 221 of the voltage regulator 180 with the other side 222 thereof interconnected to the bimetal member 183. In this manner, the heating coil 221 regulates the bimetal member 183 of the voltage regulator 180 to maintain the voltage produced in the secondary winding 167 of the transformer 165 at the selected voltage in a manner well known in the art.

The terminal 218 is also interconnected to another terminal 223 by a lead 224.

A bimetallic member 225 is provided and is electrically interconnected to the terminal 223, the bimetallic member 225 having a free end carrying an electrical contact 226. The bimetal member 225 senses the temperature produced by the heating coil 185 for a purpose hereinafter described whereby the contact 226 is moved toward and away from an adjustable contact 227 in response to the temperature produced by the coil 185.

The bimetal member 225 is mechanically interconnected to a pointer 228 movable across the dial face 205 to cooperate with the doneness indicating means 206 of the dial 205. However, the position of the pointer 228 on the dial 205 is not readily viewable to the housewife until the light source 198 is energized in a manner hereinafter described.

The movable contact 227 has the position thereof adjusted by a control knob 229 on the control panel of the oven or the like, the control knob 229 having a pointer 230 cooperable in reference to suitably labeled reference points 231 on the control panel.

Thus, when the operator of the oven desires to utilize the meat probe 207, the operator moves the control knob 229 to place the pointer 230 at the desired doneness for the food to be cooked in the oven and receiving the meat probe 207 so that the position of the contact 227 will be appropriately set relative to the contact 226 in a manner hereinafter described.

The contact 227 is interconnected to the lead 149 of the heating element 148 of the heat motor 133 by a lead 232.

The operation of the control system 164 of this invention for automatically controlling the temperature setting of the control device 11 will now be described.

Assuming that the housewife desires to cook a roast or the like in the oven and desires to have the roast cooked at a certain high temperature for a period of say three hours, the housewife adjusts the timer clock 172 to cause the timer clock 172 to close the switch blade 174 against the contact 173 after the lapse of three hours. The housewife then sets the control knob 36 of the control device 11 at the desired high cooking temperature and places the roast in the oven whereby the control device 11 will maintain the temperature in the oven at the temperature selected by the control knob 36 in the manner previously described.

However, after the lapse of three hours, the timer clock 172 closes the switch blade 174 against the contact 173 to energize the heating coil 148 of the heat motor 133 so that the heat motor 133 will unlatch the actuator 121 so that the same can move from the position illustrated in FIGURE 5 to the position illustrated in FIGURE 6 to set the control device 11 at a relatively low and noncooking temperature thereof in the manner previously described. In this manner, the oven will maintain the roast at the warmth retaining and non-cooking temperature for substantially an indefinite length of time until the housewife returns and turns off the control device 11 with the control knob 36 and serves the roast.

When the control knob 36 is turned to its off position, it can be seen that the actuator 121 is moved back from the position illustrated in FIGURE 6 to the position illustrated in FIGURE 5 and latched by the latch member 152 in the manner previously described.

Therefore, it can be seen that the control system 164 illustrated in FIGURE 9 is adapted to automatically reduce the temperature setting of the control device 11 after the period of a selected lapsed time as determined by the timer clock 172.

For example, when the switch blade 174 bridges the contacts 170 and 173, it can be seen that current is permitted to flow through the heating coil 148 of the heat motor 133 by passing from the end 178 of the secondary winding 167 of the transformer 165 through lead 204, lead 150, coil 148, lead 149, contact 173, switch blade 174, contact 170 and lead 169 back to the end 168 of the secondary winding.

If the housewife or the like desired to cook the previously described roast by means of the meat probe 207, the housewife plugs in the plugs 210 and 213 of the meat probe 207 and inserts the probe end 215 of the meat probe 207 substantially into the middle of the roast or the like.

Thereafter, the housewife adjusts the selector knob 229 to move the pointer 230 to the desired doneness of the roast, which in the example illustrated in FIGURE 9 is for rare roast beef. This adjustment of the control knob 229 adjusts the position of the contact 227 through suitable mechanical means to a preselected position of the contact 227 relative to the contact 226. The contact 226 is normally disposed away from the contact 227 and only moves toward the same in proportion to the temperature sensed by the bimetal member 225 under the influence of the heater coil 185 in a manner hereinafter described.

Thereafter, the housewife or the like sets the control knob 36 of the control device 11 at the desired cooking cooking temperature and then leaves the oven unattended.

As the roast is now being cooked at the selected temperature, the probe resistor 208 and the anticipator resistor 190 are disposed in parallel relation and in series relation with the heater 185 whereby a certain current is adapted to flow from the end 178 of the secondary winding 167 of the transformer 165 through the lead 181, contact 179, contact 182 conductive bimetal member 183 of the voltage regulator 180, lead 186, heater coil 185 and lead 189 to terminal 188 whereby the current divides and leads to ground respectively through the resistors 208 and 190.

In particular, the current at the terminal 188 passes through the anticipator resistor 190, lead 193, contact 194, switch blade 200 and lead 201 to ground. The current at terminal 188 also passes through lead 215′, terminal plug 210, lead 200, probe resistor 208, lead 214, terminal plug 213 and lead 216 to ground whereby it can be seen that the heater coil 185 is placed in series parallel relationship with the resistors 208 and 190.

A certain amount of current initially passing through the heating coil 185 to heat the bimetal member 225 carrying the contact 226 is not sufficient to cause the bimetal member 225 to move the contact 226 into contact with contact 227.

However, the current flow through the heating coil 185 progressively increases as the cooking of the roast progressively increases, because the resistance of the probe resistance 208 decreases as the internal temperature of the roast in the oven increases due to the cooking thereof.

When the decrease in the resistance of the probe resistance 208 reaches a particular point in the doneness of the roast, the current flow through the heating coil 185 is such that the same has heated the bimetal member 225 to such a degree that the same has moved the contact 226 into electrical contact with the contact 227 whereby the pointer 228 is disposed in the position illustrated in FIGURE 9. However, at this time the pointer 228 is giving a false reading of the doneness of the roast because the roast must be further cooked during the time the temperature of the oven moves downwardly from the set high temperature thereof to the relatively low and non-cooking warmth retaining temperature.

However, as the pointer 228 was moving across the dial face 205 to the position illustrated in FIGURE 9, the housewife or the like could not view such position of the pointer 228 because the light source 198 was not energized whereby the housewife is not aware that the pointer 228 is giving a false reading.

When the contact 226 makes electrical contact with the contact 227 in the manner previously described, the heating coil 148 of the heat motor 133 is now energized because current can now flow from the end 178 of the secondary winding 167 of the transformer 164 through lead 204, lead 150, heater 148, lead 149, lead 232, contact 227, contact 226, conductive bimetal member 225, terminal 223, lead 224, terminal 218, lead 219 and lead 216 to ground.

When the heating coil 148 of the heat motor 133 has caused the heat motor 133 to move the latch member 152 from the position illustrated in FIGURE 5 to the position illustrated in FIGURE 6, it can be seen that the actuator 121 moves from the position illustrated in FIGURE 5 to the position illustrated in FIGURE 6 to set the control device 11 at the low noncooking and warmth retaining temperature. As the actuator 121 has the arm 126 thereof moving from the position illustrated in FIGURE 5 to the position illustrated in FIGURE 6, the end 127 thereof engages the actuator 202 of the switch 195 to move the switch blade 200 from the position illustrated in FIGURE 9 against the contact 196.

With the switch blade 200 now moved against the contact 196, it can be seen that the anticipator resistor 190 is no longer interconnected to ground through the switch blade 200 whereby no more current flows through the anticipator resistor 190. Since all of the current flowing through the heater coil 185 now must also flow through the meat probe resistor 208, the amount of heat produced by the heating coil 185 drops so that the bimetal member 225 again moves the contact 226 away from the contact 227 whereby the pointer 228 likewise moves away from the false reading position thereof to the actual reading position thereof.

Simultaneously with the dropping of the anticipator resistor 190 from the circuit, the switch blade 200 causes the light source 198 to be energized as current can now flow from the end 178 of the secondary winding 167 of the transformer 165 through lead 204, light source 198, lead 199, contact 196, switch blade 200 and lead 201 to ground whereby the light source 198 now renders the dial face 205 and pointer 228 viewable at the control panel of the oven.

Since the temperature of the oven is progressively decreasing from the preselected high cooking temperature thereof to the low noncooking and warmth retaining temperature because of the actuated actuator 121 in the manner previously described, the internal temperature of the roast still increases whereby the resistance of the meat probe resistance 208 correspondingly decreases permitting a larger amount of current to flow through the heating coil 185 and increase the temperature sensed by the bimetal member 225. As the temperature sensed by the bimetal member 225 again reaches the degree to cause the contact 226 to be placed into contact with the contact 227, it can be seen that the pointer 228 now viewable at the dial 205 by the continuously energized light source 198 will now be in the position illustrated in full lines in FIGURE 9 to indicate that the roast is done.

However, the pointer 228 will remain at the position illustrated in FIGURE 9 because the contact 226 can not be further moved downwardly by the bimetal member 225 as the position thereof is limited by the set position of the contact 227.

Thus, the control device 11 maintains the oven at the low non-cooking and warmth retaining temperature in the manner previously described until the housewife returns and removes the roast and turns off the control knob 36, the return of the control knob 36 to its position relatching the actuator 121 from the position illustrated in FIGURE 6 back to the position illustrated in FIGURE 5 whereby the actuator 202 of the switch 195 is again actuated to place the switch blade 200 back to the position illustrated in FIGURE 9 to turn off the light source 198.

Therefore, it can be seen that the control system 164 of this invention is readily adapted to utilize the meat probe 207 to automatically reduce the temperature of the oven when the meat probe 207 senses the desired doneness of the food receiving the same, the system 164 being so constructed and arranged that the means 205 and 228 indicating the doneness of the meat will not be rendered viewable until the same provides a true reading of the doneness of the meat or the like.

Accordingly, it can be seen that this invention not only provides an improved control system or the like, but also this invention provides improved parts for such a control system or the like.

While the form of the invention now preferred has been disclosed as required by the statutes, other forms may be used, all coming within the scope of the claims which follow.

What is claimed is:

1. In a control system for an oven having heating means, a temperature effect indicating means normally being substantially non-viewable, means for causing said indicating means to be readily viewable when said last-named means is actuated, and a meat probe for actuating said last-named means when said meat probe senses a predetermined internal temperature of food in said oven and receiving said probe.

2. In a control system for an oven having heating means, a thermostatic unit for operating said heating means to maintain said oven at a selected cooking temperature, a temperature effect indicating means normally being substantially non-viewable, means for causing said indicating means to be readily viewable when said last-named means is actuated, and a meat probe for actuating said last-named means when said meat probe senses a predetermined internal temperature of food in said oven and receiving said probe.

3. In a control system for an oven having heating means, a thermostatic unit for operating said heating means to maintain said oven at a selected cooking temperature, a temperature effect indicating means normally being substantially non-viewable, means for causing said indicating means to be readily viewable when said last-named means is actuated, and a meat probe for actuating said last-named means when said meat probe senses a predetermined internal temperature of food in said oven and receiving said probe, said thermostatic unit having automatic means to lower and maintain the temperature of said oven to a non-cooking and warmth retaining temperature, said meat probe actuating said automatic means when said meat probe senses a predetermined internal temperature of said food.

4. In a control system for an oven having heating means, a thermostatic unit for operating said heating means to maintain said oven at a selected cooking temperature, a temperature effect indicating means normally being substantially non-viewable, means for causing said indicating means to be readily viewable when said last-named means is actuated, and a meat probe for actuating said last-named means when said meat probe senses a predetermined internal temperature of food in said oven and receiving said probe, said thermostatic unit having automatic means to lower and maintain the temperature of said oven to a non-cooking and warmth retaining temperature, said meat probe actuating said automatic means when said meat probe senses a predetermined internal temperature of said food, and a timer clock having means for actuating said automatic means independently of said meat probe.

5. In a control system for an oven having heating means, a temperature effect indicating means normally being substantially non-viewable, means for causing said indicating means to be readily viewable when said last-named means is actuated, and a meat probe means for actuating said last-named means when said meat probe senses a predetermined internal temperature of food in said oven and receiving said probe, said meat probe means including a first resistor insertable in said food and having the resistance thereof decreased as the temperature thereof rises, an anticipator second resistor in parallel with said first resistor, a third resistor in series with said parallel resistors, and an electrical switch sensing the temperature of said third resistor so that when said third resistor reaches a predetermined temperature said switch closes and actuates said last-named means.

6. In a control system for an oven having heating means, a thermostatic unit for operating said heating means to maintain said oven at a selected cooking temperature, said thermostatic unit having automatic means to lower and maintain the temperature of said oven to a non-cooking and warmth retaining temperature, a temperature effect indicating means normally being substantially non-viewable, means for causing said indicating means to be readily viewable when said last-named means is actuated, meat probe means for actuating said last-named means when said meat probe means senses a predetermined internal temperature of food in said oven and receiving said probe, said meat probe means including a first resistor insertable in said food and having the resistance thereof decreased as the temperature thereof rises, an anticipator second resistor in parallel with said first resistor, a third resistor in series with said parallel resistors, and an electrical switch sensing the temperature of said third resistor so that when said third resistor reaches a predetermined temperature said switch closes and actuates said automatic means and said last-named means.

7. In a control system as set forth in claim 6, said automatic means including a heat motor that moves a switching member from one position thereof to another position thereof when said heat motor is energized by the closing of said switch, said switching member when in said other position thereof actuating said last-named means.

8. In a control system as set forth in claim 7, a timer clock having means for energizing said heat motor independently of said meat probe means and said switch.

9. In a control system for an oven having heating means, a temperature effect indicating window, a temperature effect indicating pointer movable behind said window, a light source for rendering the location of said pointer viewable through said window when said light source is energized, and a meat probe for energizing said light source when said meat probe senses a predetermined internal temperature of food in said oven and receiving said probe.

10. In a control system for an oven having heating means, a thermostatic unit for operating said heating means to maintain said oven at a selected cooking temperature, a temperature effect indicating window, a temperature effect indicating pointer movable behind said window, a light source for rendering the location of said pointer viewable through said window when said light source is energized, and a meat probe for energizing said light source when said meat probe senses a predetermined internal temperature of food in said oven and receiving said probe.

11. In a control system for an oven having heating means, a thermostatic unit for operating said heating means to maintain said oven at a selected cooking temperature, a temperature effect indicating window, a temperature effect indicating pointer movable behind said window, a light source for rendering the location of said pointer viewable through said window when said light source is energized, and a meat probe for energizing said light source when said meat probe senses a predetermined internal temperature of food in said oven and receiving said probe, said thermostatic unit having automatic means to lower and maintain the temperature of said oven to a non-cooking and warmth retaining temperature, said meat probe actuating said automatic means when said meat probe senses a predetermined internal temperature of said food.

12. In a control system for an oven having heating means, a thermostatic unit for operating said heating means to maintain said oven at a selected cooking temperature, a temperature effect indicating window, a temperature effect indicating pointer movable behind said window, a light source for rendering the location of said pointer viewable through said window when said light source is energized, and a meat probe for energizing said light source when said meat probe senses a predetermined internal temperature of food in said oven and receiving said probe, said thermostatic unit having automatic means to lower and maintain the temperature of said oven to a non-cooking and warmth retaining temperature, said meat probe actuating said automatic means when said meat probe senses a predetermined internal temperature of said food, and a timer clock having means for actuating said automatic means independently of said meat probe.

13. In a control system for an oven having heating means, a temperature effect indicating window, a temperature effect indicating pointer movable behind said window, a light source for rendering the location of said pointer viewable through said window when said light source is energized, and a meat probe means for energizing said light source when said meat probe means senses a predetermined internal temperature of food in said oven and receiving said probe, said meat probe means including a first resistor insertable in said food and having the resistance thereof decreased as the temperature thereof rises, an anticipator second resistor in parallel with said first resistor, a third resistor in series with said parallel resistors, and an electrical switch sensing the temperature of said third resistor so that when said third resistor reaches a predetermined temperature said switch closes and energizes said light source.

14. In a control system for an oven having heating means, a thermostatic unit for operating said heating means to maintain said oven at a selected cooking temperature, said thermostatic unit having automatic means to lower and maintain the temperature of said oven to a non-cooking and warmth retaining temperature, a temperature effect indicating window, a temperature effect indicating pointer movable behind said window, a light source for rendering the location of said pointer viewable through said window when said light source is energized, meat probe means for energizing said light source when said meat probe means senses a predetermined internal temperature of food in said oven and receiving said probe, said meat probe means including a first resistor insertable in said food and having the resistance thereof decreased as the temperature thereof rises, an anticipator second resistor in parallel with said first resistor, a third resistor in series with said parallel resistors, and an electrical switch sensing the temperature of said third resistor so that when said third resistor reaches a predetermined temperature said switch closes to actuate said automatic means and energize said light source, said switch including a first movable contact which selects said predetermined temperature of said third resistor that closes said switch, said switch including a second movable contact operatively interconnected to said pointer.

15. In a control system as set forth in claim 14, said automatic means including a heat motor that moves a switching member from one position thereof to another position thereof when said heat motor is energized by the closing of said switch, said switching member when in said other position thereof energizing said light source.

References Cited

UNITED STATES PATENTS

| | | | |
|---|---|---|---|
| 2,890,429 | 6/1959 | Baker | 338—28 |
| 2,914,644 | 11/1959 | Holtkamp | 219—413 |
| 2,989,611 | 6/1961 | Weber | 236—15 |
| 3,070,685 | 12/1962 | Bergsma | 236—15 |
| 3,212,709 | 10/1965 | Hanssen | 236—15 |

EDWARD J. MICHAEL, *Primary Examiner.*